United States Patent
Huang et al.

(10) Patent No.: US 11,967,025 B2
(45) Date of Patent: Apr. 23, 2024

(54) DETECTION OF BOUNDARY LOOPS IN NON-MANIFOLD MESHES

(71) Applicant: Tencent America LLC, Palo Alto, CA (US)

(72) Inventors: Chao Huang, Palo Alto, CA (US); Xiang Zhang, Sunnyvale, CA (US); Jun Tian, Belle Mead, NJ (US); Xiaozhong Xu, State College, PA (US); Shan Liu, San Jose, NJ (US)

(73) Assignee: TENCENT AMERICA LLC, Palo Alto, CA (US)

( * ) Notice: Subject to any disclaimer, the term of this patent is extended or adjusted under 35 U.S.C. 154(b) by 105 days.

(21) Appl. No.: 17/950,836

(22) Filed: Sep. 22, 2022

(65) Prior Publication Data
US 2023/0147459 A1 May 11, 2023

Related U.S. Application Data

(60) Provisional application No. 63/276,444, filed on Nov. 5, 2021.

(51) Int. Cl.
*G06T 17/20* (2006.01)
*G06T 7/13* (2017.01)

(52) U.S. Cl.
CPC .............. *G06T 17/205* (2013.01); *G06T 7/13* (2017.01); *G06T 2207/20164* (2013.01)

(58) Field of Classification Search
None
See application file for complete search history.

(56) References Cited

U.S. PATENT DOCUMENTS

| | | | | |
|---|---|---|---|---|
| 6,184,897 B1* | 2/2001 | Gueziec | .................. | G06T 17/20 345/440 |
| 6,452,596 B1* | 9/2002 | Gueziec | .................. | G06T 9/001 345/440 |
| 8,531,456 B2* | 9/2013 | Fischer | ................... | G06T 17/20 345/419 |
| 2006/0013505 A1* | 1/2006 | Yau | ........................ | G06V 20/64 382/285 |
| 2010/0328311 A1* | 12/2010 | Lakshmanan | ........... | G06T 17/20 345/427 |
| 2013/0297059 A1* | 11/2013 | Griffith | .................. | B29C 64/386 700/98 |
| 2017/0169608 A1* | 6/2017 | Starhill | ................... | G06T 15/04 |

* cited by examiner

*Primary Examiner* — Sultana M Zalalee
(74) *Attorney, Agent, or Firm* — ARENTFOX SCHIFF LLP

(57) ABSTRACT

In some examples, an apparatus for mesh processing includes processing circuitry. The processing circuitry receives a first mesh frame with polygons representing a surface of an object, and determining that the first mesh frame is a non manifold type mesh in response to one or more singularity components in the first mesh frame. The processing circuitry converts the first mesh frame to a second mesh frame that is a manifold type mesh. The first mesh frame has first boundary loops that respectively correspond to second boundary loops in the second mesh frame. The processing circuitry detects the second boundary loops in the second mesh frame, and determines the first boundary loops in the first mesh frame according to the second boundary loops in the second mesh frame.

20 Claims, 13 Drawing Sheets

DETECTION OF BOUNDARY LOOPS IN NON-MANIFOLD MESHES

INCORPORATION BY REFERENCE

This present application claims the benefit of priority to U.S. Provisional Application No. 63/276,444, "Detection of Boundary Loops in Non-manifold Meshes" filed on Nov. 5, 2021. The entire disclosure of the prior application is hereby incorporated by reference in its entirety.

TECHNICAL FIELD

The present disclosure describes embodiments generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, point clouds and meshes can be used as 3D representations of the world.

SUMMARY

Aspects of the disclosure provide methods and apparatuses for mesh processing. In some examples, an apparatus for mesh processing includes processing circuitry. The processing circuitry receives a first mesh frame with polygons representing a surface of an object, and determining that the first mesh frame is a non manifold mesh in response to one or more singularity components in the first mesh frame. The processing circuitry converts the first mesh frame to a second mesh frame that is a manifold mesh. The first mesh frame has first boundary loops that respectively correspond to second boundary loops in the second mesh frame. The processing circuitry detects the second boundary loops in the second mesh frame, and determines the first boundary loops in the first mesh frame according to the second boundary loops in the second mesh frame.

In some examples, at least one vertex in the first mesh frame is duplicated in the second mesh frame.

To determine that the first mesh frame is the non manifold mesh, in some examples, the processing circuitry detects at least one of a singular vertex and/or a singular edge in the first mesh frame.

In some examples, the first mesh frame is a simplicial 2 complex mesh, the processing circuitry determines that a first vertex is a boundary vertex and a first number of incident faces and a second number of incident edges of the first vertex fails to satisfy a regular vertex requirement. Then, the processing circuitry determines that the first vertex is a singular vertex. In another example, the processing circuitry determines that a number of incident boundary edges to a first vertex is greater than 2, and determines that the first vertex is a singular vertex. In another example, the processing circuitry detects that a first edge has no incident face or has more than 2 incident faces, and determines that the first edge is a singular edge.

In some examples, the first mesh frame is a simplicial 2 complex mesh, to convert the first mesh frame to the second mesh frame, the processing circuitry converts a singular vertex of the first mesh frame into one or more alias vertices in the second mesh frame. The one or more alias vertices are regular vertices. In another example, the processing circuitry converts a first singular vertex and a second singular vertex of a singular edge of the first mesh frame into respective alias vertices in the second mesh frame. The respective alias vertices are regular vertices.

In some examples, the processing circuitry identifies a first incident face and a second incident face that are incident to the singular vertex, the first incident face includes a first incident edge to the singular vertex, the second incident face includes a second incident edge to the singular vertex, the first incident edge and the second incident edge are adjacent incident edges from different incident faces. The processing circuitry generates an alias vertex with the first incident face and the second incident face being incident to the alias vertex in the second mesh frame instead of the singular vertex.

To determine the first boundary loops in the first mesh frame according to the second boundary loops in the second mesh frame, in an example, the processing circuitry, in response to the alias vertex in the second boundary loops, replaces the alias vertex in the second boundary loops with the singular vertex.

In some examples, the processing circuitry detects an existence of one or more interior boundary loops based on a relationship between a Euler characteristic and Betti numbers in the first mesh frame.

Aspects of the disclosure also provide a non-transitory computer-readable medium storing instructions which when executed by a computer cause the computer to perform any one or a combination of the methods for mesh processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
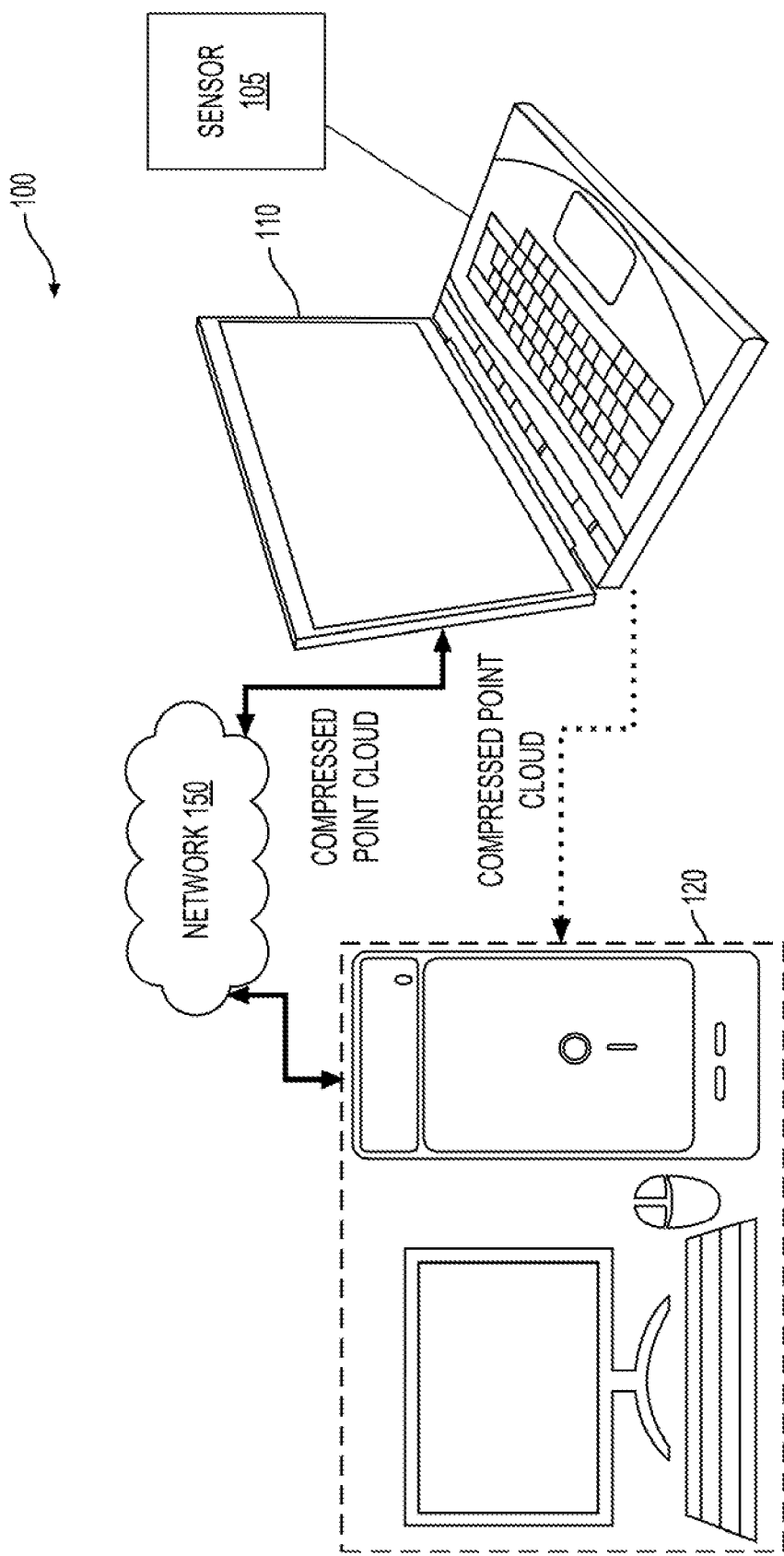
FIG. 1 shows a block diagram of a communication system in some examples.

Aspects of the disclosure provide techniques in the field of three dimensional (3D) media processing.

Technology developments in 3D media processing, such as advances in three dimensional (3D) capture, 3D modeling, and 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experience, 3D models are becoming ever more sophisticated, and the creation and consumption of 3D models occupy a significant amount of data resources, such as data storage, data transmission resources.

According to some aspects of the disclosure, point clouds and meshes can be used as 3D models to represent immersive contents.

A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices.

According to some aspects of the disclosure, some coding tools for point cloud compression (PCC) can be used for mesh compression. For example, a mesh can be re-meshed to generate a new mesh that the connectivity information of the new mesh can be inferred. The vertices of the new mesh, and the attributes associated with the vertices of the new mesh can be considered as points in a point cloud and can be compressed using PCC codecs.

Point clouds can be used to reconstruct an object or a scene as a composition of points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the V-PCC scheme can use existing video codecs to compress the geometry, occupancy, and texture of a point cloud as three separate video sequences. The extra metadata needed to interpret the three video sequences is compressed separately. A small portion of the overall bitstream is the metadata, which could be encoded/decoded efficiently using software implementation in an example. The bulk of the information is handled by the video codec.

FIG. 1 illustrates a block diagram of a communication system (100) in some examples. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, the Internet, and the like.

Figure 2:
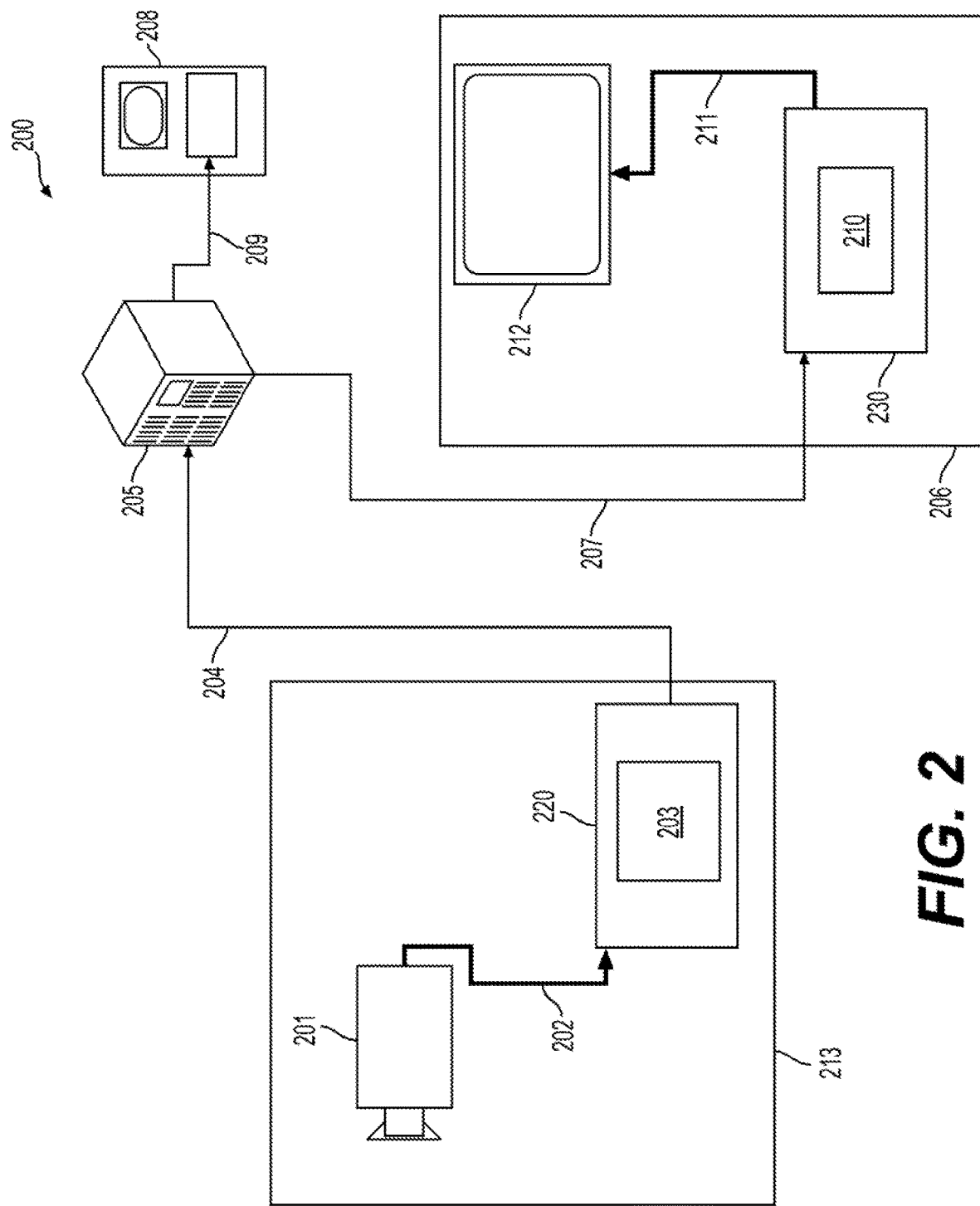
FIG. 2 shows a block diagram of a streaming system in some examples.

FIG. 2 illustrates a block diagram of a streaming system (200) in some examples. The streaming system (200) is a use application of point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
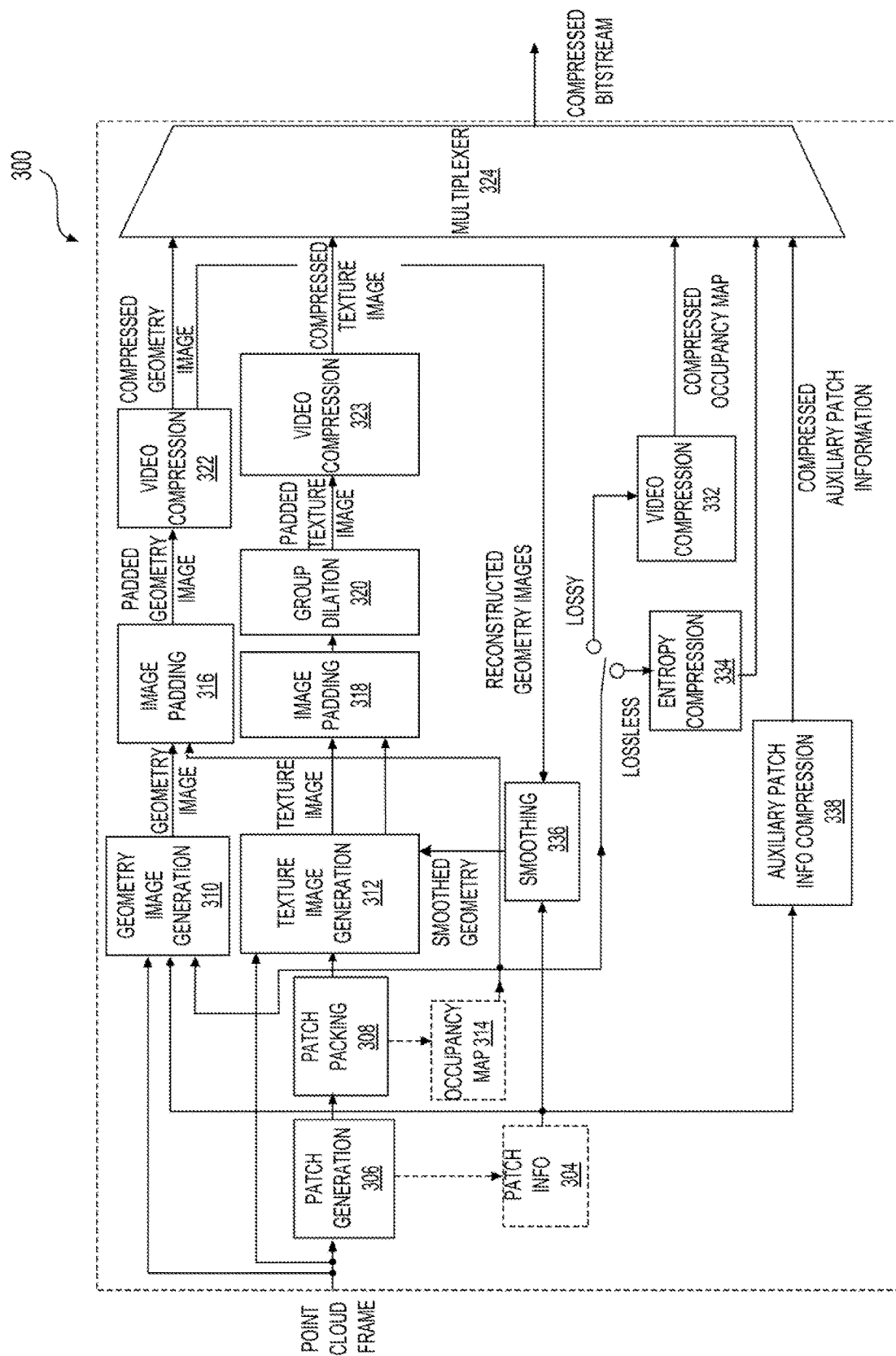
FIG. 3 shows a block diagram of an encoder for encoding point cloud frames in some examples.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into image-based representations along with some metadata (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

In some examples, the patch info module (304) can collect the patch information that indicates sizes and shapes of the patches. In some examples, the patch information can be packed into an image frame and then encoded by the auxiliary patch info compression module (338) to generate the compressed auxiliary patch information.

In some examples, the patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
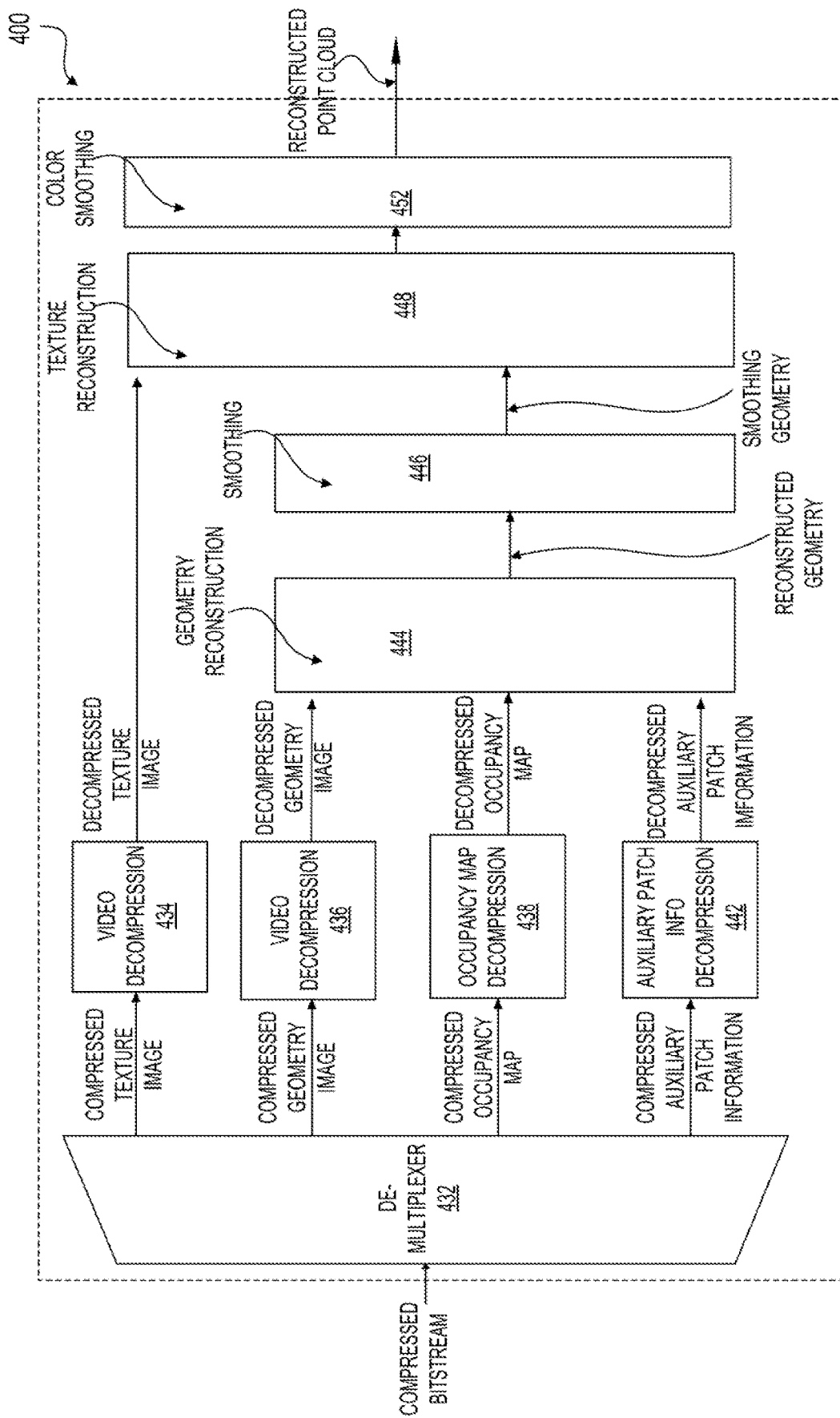
FIG. 4 shows a block diagram of a decoder for decoding a compressed bitstream corresponding to point cloud frames in some examples.

FIG. 4 shows a block diagram of a V-PCC decoder (400) for decoding compressed bitstream corresponding to point cloud frames, in some examples. In some examples, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
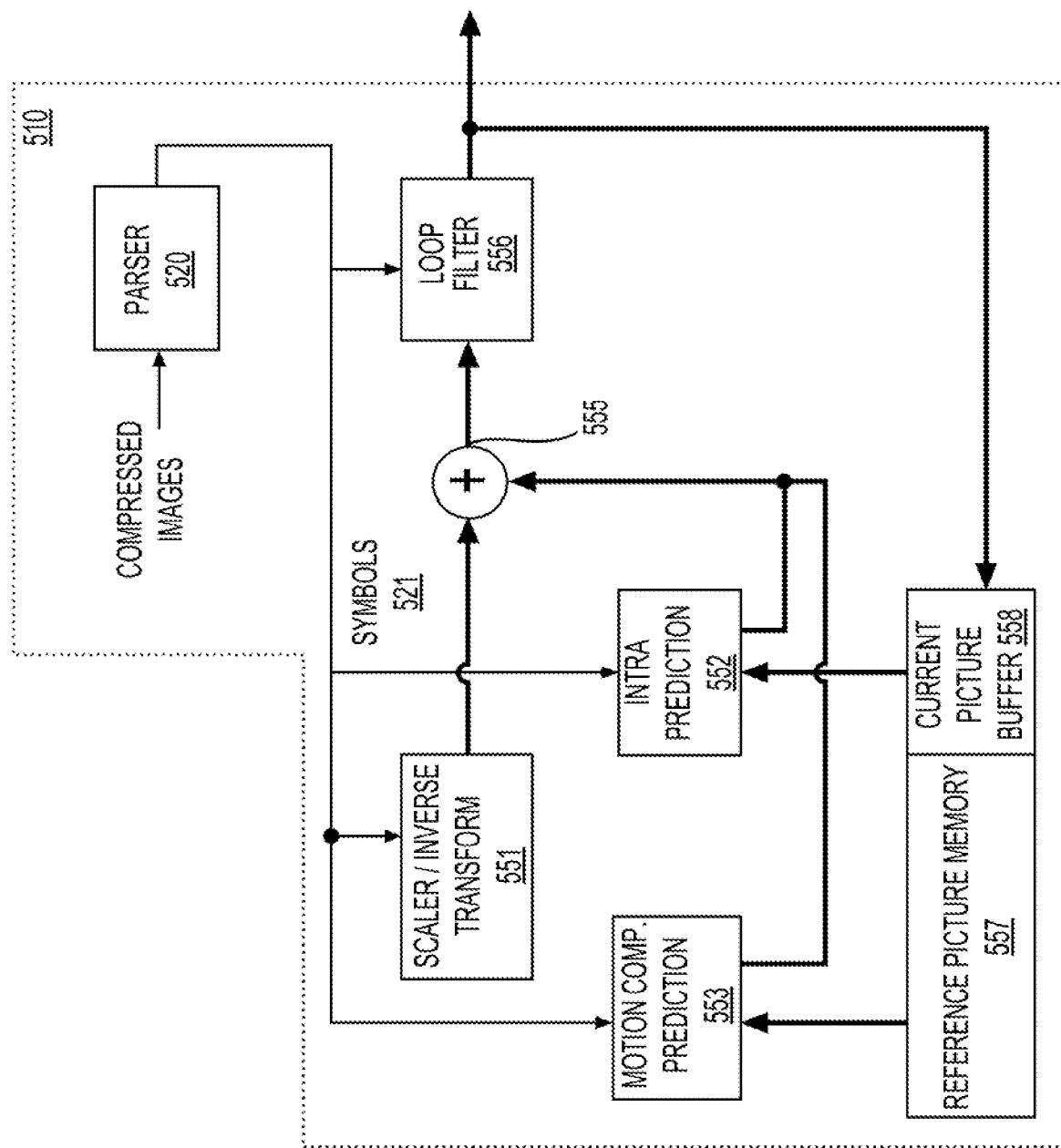
FIG. 5 shows a block diagram of a video decoder in some examples.

FIG. 5 shows a block diagram of a video decoder (510) in some examples. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
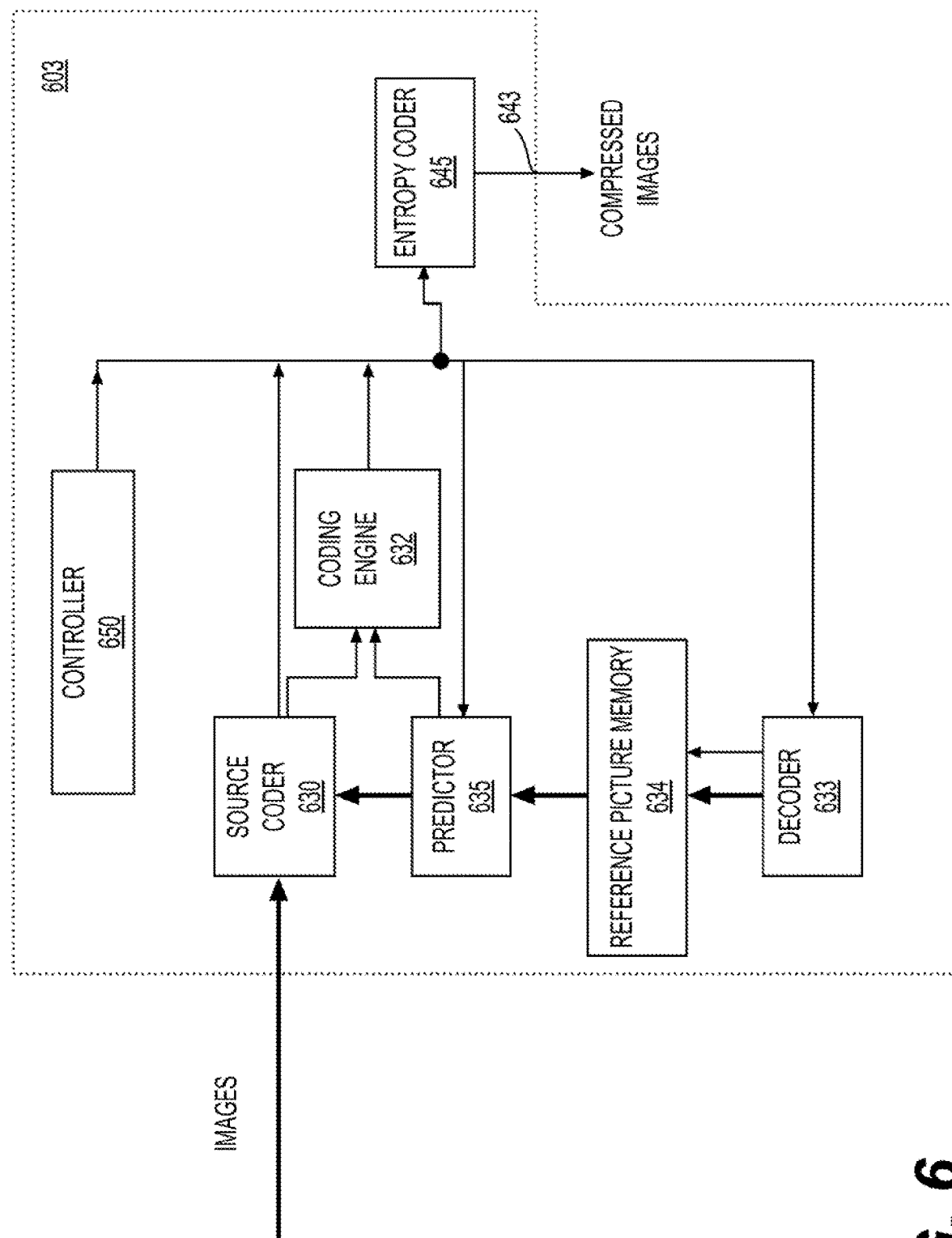
FIG. 6 shows a block diagram of a video encoder in some examples.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
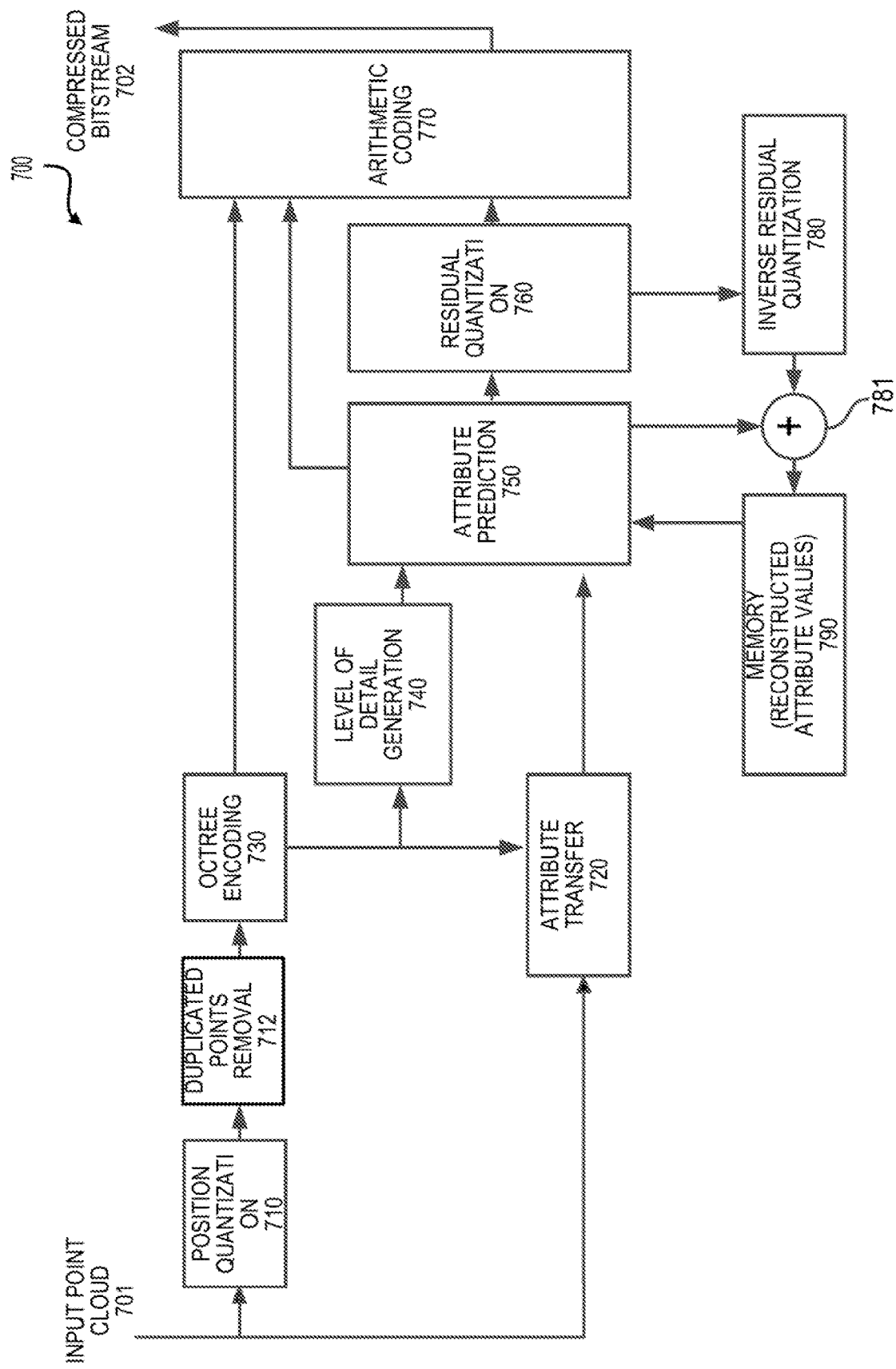
FIG. 7 shows a block diagram of an encoder for encoding point cloud frames in some examples.

FIG. 7 shows a block diagram of a G-PCC encoder (700) in some examples. The G-PCC encoder (700) can be configured to receive point cloud data and compress the point cloud data to generate a bit stream carrying compressed point cloud data. In an embodiment, the G-PCC encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the G-PCC encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
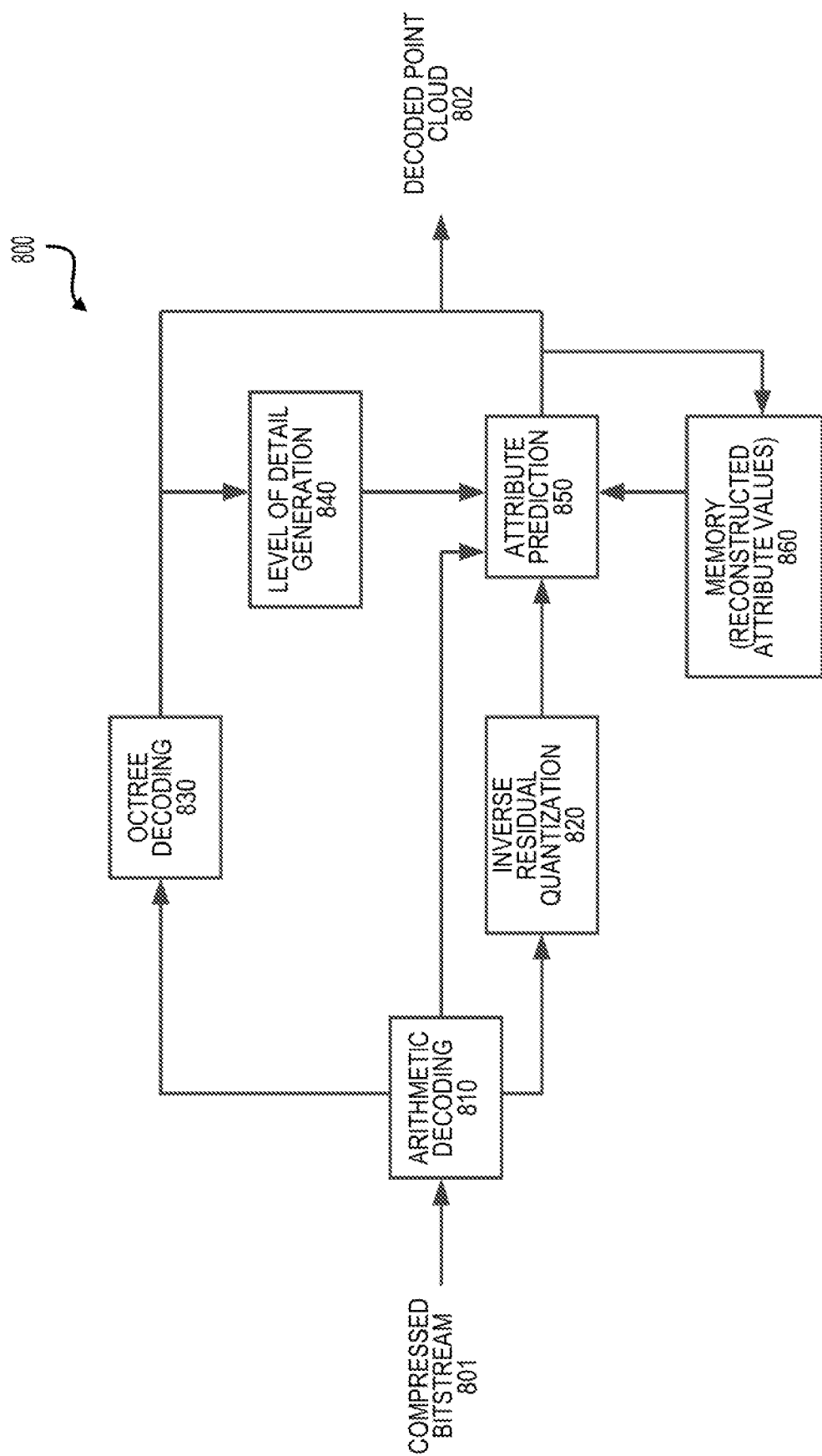
FIG. 8 shows a block diagram of a decoder for decoding a compressed bitstream carrying point cloud frames in some examples.

FIG. 8 shows a block diagram of a G-PCC decoder (800) in accordance with an embodiment. The G-PCC decoder (800) can be configured to receive a compressed bitstream and perform point cloud data decompression to decompress the bitstream to generate decoded point cloud data. In an embodiment, the G-PCC decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the G-PCC decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, mesh compression can use coding tools different from PCC coding tools or can use PCC coding tools, such as above PCC (e.g., G-PCC, V-PCC) encoders, above PCC (e.g., G-PCC, V-PCC) decoders, and the like.

A mesh (also referred to as a mesh model, a mesh frame) of an object can include polygons that describe the surface of the object. Each polygon can be defined by vertices of the polygon in 3D space and edges that connect the vertices into the polygon. The information of how the vertices are connected (e.g., information of the edges) is referred to as connectivity information. In some examples, a mesh of an object is formed by connected triangles that describe the surface of the object. Two triangles sharing an edge are referred to as two connected triangles. In some other examples, a mesh of an object is formed by connected quadrilaterals. Two quadrilaterals sharing an edge can be referred to as two connected quadrilaterals. It is noted that meshes can be formed by other suitable polygons.

In some examples, the mesh can also include attributes, such as color, normal, and the like, associated with the vertices. The attributes can be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements etc. Such information could be used for various purposes such as texture mapping and shading.

In some embodiments, a mesh can include components that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices, and are also referred to as 3D coordinates. In some examples, the connectivity information includes a set of vertex indices that describes how to connect the vertices to create a 3D surface. In some examples, the mapping information describes how to map the mesh surface to 2D regions of the plane. In an example, the mapping information is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by the mapping information.

According to an aspect of the disclosure, some techniques that are referred to as UV mapping or mesh parameterization are used to map surfaces of a mesh in the 3D domain to 2D domain. In some examples, a mesh is partitioned into patches in the 3D domain. A patch is a contiguous subset of the mesh with a boundary formed of boundary edges. A boundary edge of a patch is an edge that belongs to only one polygon of the patch, and is not shared by two adjacent polygons in the patch. Vertices of boundary edges in a patch are referred to as boundary vertices of the patch, and non-boundary vertices in a patch can be referred to as interior vertices of the patch in some examples.

In some examples, a mesh of an object is formed by connected triangles, and the mesh can be partitioned into patches, each patch is a subset of the connected triangles. A boundary edge of a patch is an edge that belongs to only one triangle in the patch and is not shared by adjacent triangles in the patch. Vertices of boundary edges in a patch are referred to as boundary vertices of the patch, and non-boundary vertices in a patch can be referred to as interior vertices of the patch in some examples. A boundary loop includes a sequence of boundary vertices, boundary edges formed by the sequence of boundary vertices can form a loop that is referred to as a boundary loop.

Boundary loop detection has many applications in mesh processing, such as remeshing, mesh compression, mesh deformation, mesh registration and the like. In some related examples, algorithms are developed to detect boundary loops in only manifold meshes. Some aspects of the disclosure provide techniques to detect boundary loops in non manifold meshes.

Some aspects of the disclosure provide techniques to convert non-manifold meshes to manifold meshes without affecting the boundary loops. Thus, the algorithms that are developed to detect boundary loops in the manifold meshes can be used to detect the boundary loops in the converted manifold meshes.

An orientable simplicial 2-complex mesh refers to a mesh that is made of 0-simplexes (points), 1-simplexes (line segments) and 2-simplexes (triangles). It is noted that while orientable simplicial 2-complex meshes are used in the following description to illustrate techniques to detect boundary loops in the non-manifold meshes, the techniques can be suitably extended to cover meshes of simplicial n-complexes (n>2) and/or meshes that are not simplicial complexes.

In some examples, a mesh of an object can include three mesh elements: vertices, edges and faces (also referred to as polygons in some examples). In some examples, a mesh is a manifold mesh (also referred to as manifold type mesh) when each edge is incident to only one or two faces and the faces incident to a vertex form a closed fan or an open fan. In some examples, a mesh is a non-manifold mesh (also referred to as non manifold type mesh) when the mesh includes some points that have no neighborhood being homeomorphic to an open disk or half disk, and a point that has no neighborhood being homeomorphic to an open disk or half disk is referred to as a singularity. A vertex that includes a singularity is referred to as a singular vertex, an edge that includes a singularity is referred to as a singular edge. A vertex having no singularity is referred to as regular vertex. An edge having no singularity is referred to as a regular edge.

In some examples, the vertices in a mesh can be categorized into interior vertices and boundary vertices. In some examples, a boundary edge is an edge that is not incident to 2 faces of the mesh. For example, a boundary edge is an edge that belongs to only one polygon of the mesh. In some examples, a boundary vertex is defined as a vertex incident to a boundary edge. For example, vertices of boundary edges are referred to as boundary vertices. Vertices that are not incident to any boundary edges are referred to as interior vertices of the mesh.

According to an aspect of the disclosure, for a simplicial 2-complex mesh, interior vertices are all regular vertices, boundary vertices can be examined to identify singular vertices. For a boundary vertex, $n_f$ denotes the number of incident faces, and $n_e$ denotes the number of incident edges. When $n_e$ is greater than $n_f$ by 1, such as represented by Eq. (1):

$$n_e = n_f + 1 \qquad \text{Eq. (1)}$$

then the boundary vertex is a regular vertex, otherwise the boundary vertex is a singular vertex.

Figure 9:
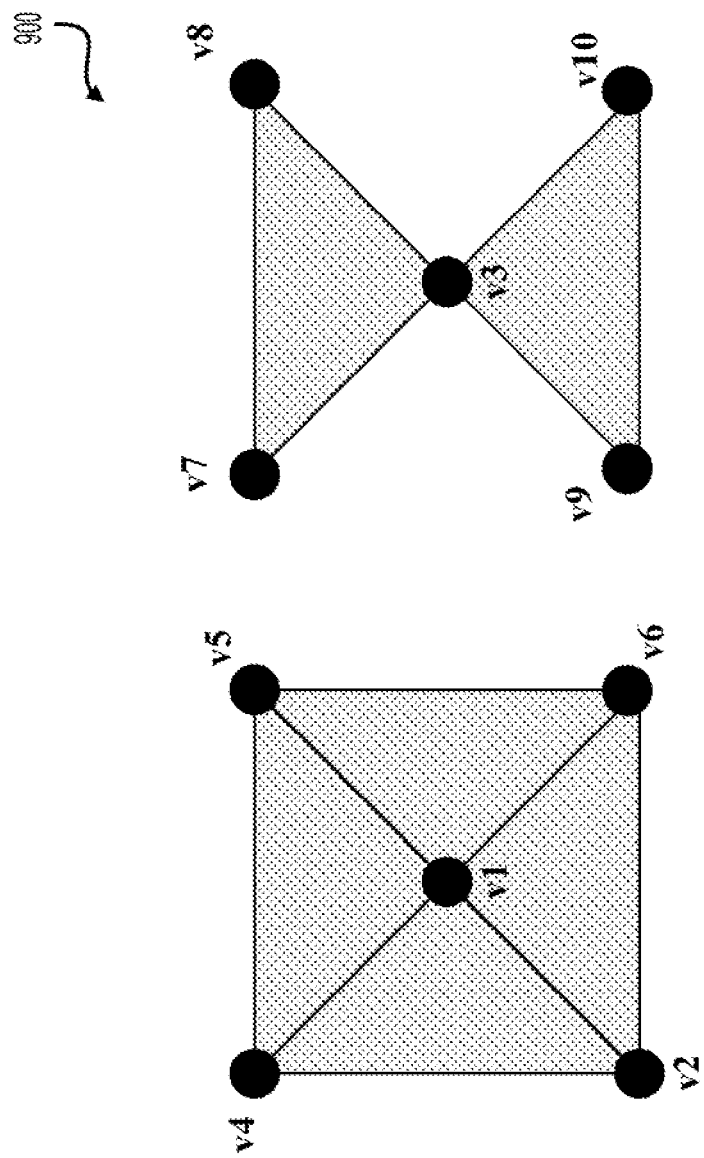
FIG. 9 shows a mesh (900) in an example.

FIG. 9 shows a mesh (900) in an example. The mesh (900) is a simplicial 2-complex mesh and includes vertices v1 to v10. The vertex v1 is an interior vertex and thus is a regular vertex. The vertices v2, and v4-v10 are boundary vertices and respectively satisfy Eq. (1), and are regular vertices. For example, the vertex v2 has two incident faces and 3 incident edges; the vertex v4 has two incident faces and 3 incident edges; the vertex v5 has two incident faces and 3 incident edges; the vertex v6 has two incident faces and 3 incident edges; the vertex v7 has one incident face and 2 incident edges; the vertex v8 has one incident face and 2 incident edges; the vertex v9 has one incident face and 2 incident edges; the vertex v10 has one incident face and 2 incident edges.

In the FIG. 9 example, the vertex v3 is a boundary vertex and has two incident faces and four incident edges, thus the vertex v3 does not satisfy Eq. (1), and is a singular vertex.

According to another aspect of the disclosure, singular vertices can be identified by the number of incident boundary edges. For example, regular boundary vertices can only have 2 incident boundary edges while singular boundary vertices have more than 2 incident boundary edges.

In the FIG. 9 example, the boundary vertices v2, and v4-v10 respectively have 2 incident boundary edges and are regular vertices; the boundary vertex v3 has four incident boundary edges and is a singular vertex.

According to another aspect of the disclosure, for a simplicial 2-complex mesh, singular edges can be identified based on the number of incident faces. For example, for an edge, when the edge has no incident face (e.g., 0 incident face) or has more than 2 incident faces, then the edge is a singular edge. When the edge has one or two incident faces, the edge is a regular edge.

Figure 10:
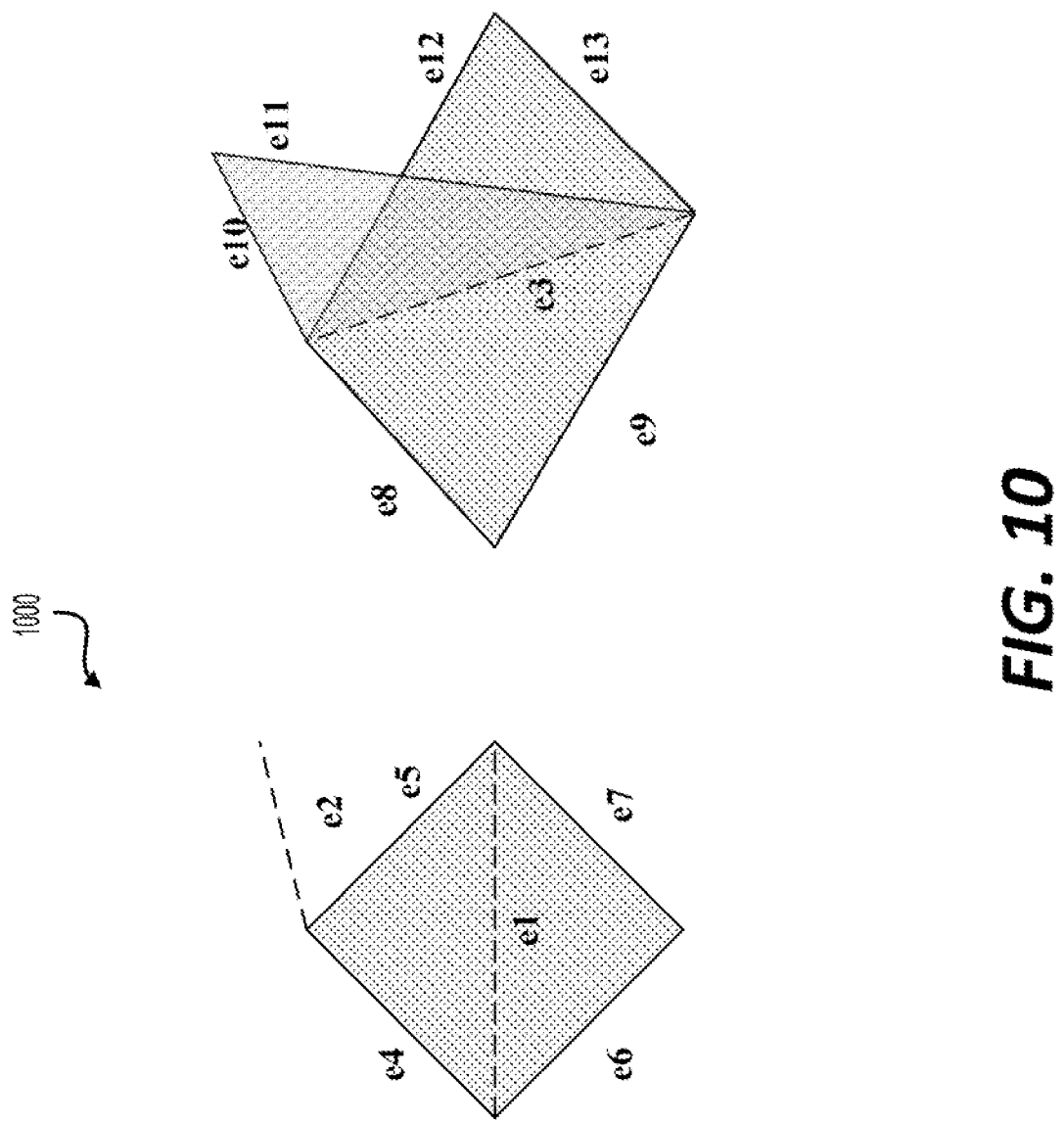
FIG. 10 shows a mesh (1000) in an example.

FIG. 10 shows a mesh (1000) in some examples. The mesh (1000) is a simplicial 2-complex mesh and includes edges e1 to e13. The edge e1 has two incident faces, and is a regular edge. The edge e2 has no incident face and is a singular edge. The edge e3 has 3 incident faces and is a singular edge. The edges e4-e13 respectively has 1 incident face and are regular edges.

According to some aspects of the disclosure, to detect boundary loops in a non manifold mesh, the non manifold mesh can be converted to a manifold mesh without affecting the boundary loop configuration, thus the boundary loops in the manifold mesh can correspond to the boundary loops in the non manifold mesh. The boundary loops of the manifold mesh can be detected by suitable algorithm. Based on the boundary loops of the manifold mesh, the corresponding boundary loops o the non manifold mesh can be determined. It is noted that while the following description using a simplicial 2-complex mesh with singular vertices to illustrate techniques to convert a non manifold mesh to a manifold mesh, the techniques can be suitably applied to other non manifold meshes, such as a non manifold mesh with singular edges, and the like.

In some examples, for a mesh that is a simplicial 2-complex mesh with only singular vertices, boundary loops can be detected by a boundary loop detection procedure for non manifold meshes. The boundary loop detection procedure for non manifold meshes includes three steps that are referred to as a first step, a second step and a third step.

In the first step (that is also referred to as topological surgery step), for each singular vertex of the mesh, incident edges can be indexed (e.g., ordered) in either clockwise or counterclockwise direction into a cyclic sequence. In the cyclic sequence, the first incident edge and the last incident edge are consecutive incident edges. Based on the cyclic sequence of incident edges to the singular vertex, loop edge pairs can be detected. A loop edge pair is defined as 2 consecutive incident edges in the cyclic sequence that are not edges of a same face. It is noted that due to the cyclic nature of the indexing, the modular arithmetic convention can be used to define the first and last incident edges as a loop edge pair, provided the first and last incident edges are not edges of the same face.

For each loop edge pair, two incident faces can be identified and an alias vertex can be split from the singular vertex to replace the singular vertex in the two identified incident faces. The alias vertex can be configured to have only two incident boundary edges that are the loop edge pair. Specifically, in an example, the original index of the singular vertex in the two identified incident faces can be replaced with a new index and the new index is recorded as an alias of the original index of the singular vertex.

After the first step (topological surgery step), the simplicial 2-complex non manifold mesh becomes a manifold mesh.

In the second step (that is referred to as boundary loop detection step), boundary loops of the manifold mesh can be detected by a suitable algorithm developed to detect boundary loops in manifold meshes.

In the third step (that is referred to as boundary loops of non manifold mesh), after boundary loops of the manifold mesh are determined, the new indices can be replaced with the original ones according to the alias relationship to determine the corresponding boundary loops of the non manifold mesh.

In some examples, a verification operation can be performed in the third step. The verification operation can verify whether the number of detected interior boundary loops in the non manifold mesh matches the number of holes detected based on the Euler characteristic and Betti numbers.

According to an aspect of the disclosure, the relationship between the Euler characteristic $\chi$ and Betti numbers for a simplicial 2-complex mesh can be expressed as in Eq. (2)

$$\chi \triangleq k_0 - k_1 + k_2 = b_0 - b_1 + b_2 \qquad \text{Eq. (2)}$$

where $k_i$ (i=0, 1, 2) is the number of i-th simplexes, and $b_i$ (i=0, 1, 2) is the i-th Betti number. For example, $b_0$ is the number of connected components, which equals to the number of connected exterior boundaries, and $b_1 = h + 2g$, where h is the number of holes enclosed by interior boundary edges and g is the number of "handles", namely genus, and $b_2$ is the number of holes enclosed by closed 2-manifolds. In some examples, $k_i$ (i=0, 1, 2, 3) and $b_0$ can be computed. When $b_2$ and g can be computed, the number of holes enclosed by interior boundary edges can be deduced from Eq. (2), which is the expected number of interior boundary loops in the simplicial 2-complex mesh.

Further, according to an aspect of the disclosure, the 2 vertices of a singular edge are singular vertices. The topological surgery in the first step can be applied to the vertices of the singular edges in simplicial 2-complex meshes to convert the non manifold meshes to manifold meshes in order to detect the boundary loops in the non manifold meshes.

Figure 11:
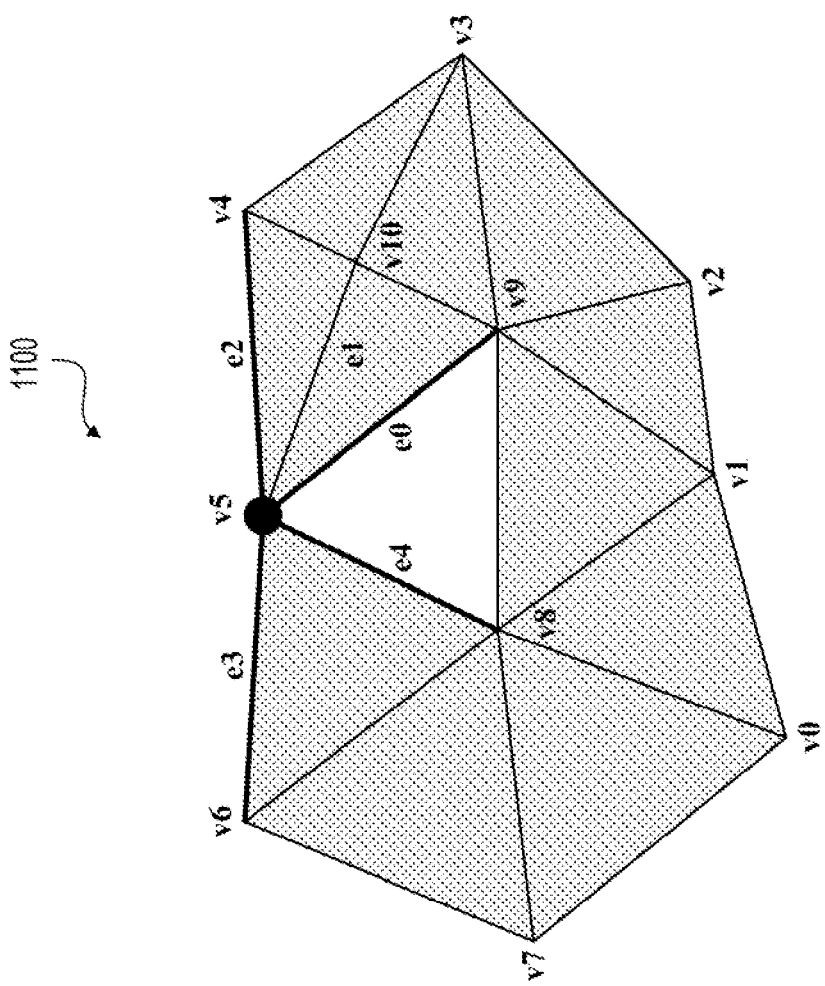
FIG. 11 shows a mesh (1100) in an example.

FIG. 11 shows a mesh (1100) in an example. The mesh (1100) is a simplicial 2-complex mesh and includes vertices v0 to v10. The vertex v10 is an interior vertex, thus is a regular vertex. The vertices v0 to v9 are boundary vertices. The vertices v0-v4 and v6-v9 respectively have two incident boundary edges, and thus are regular boundary vertices. The vertex 5 has 4 incident boundary edges and is a singular vertex.

According to an aspect of the disclosure, the boundary loop detection procedure for non manifold meshes can be applied to the mesh (1100) to detect boundary loops. The boundary loop detection procedure includes the three steps described above.

In the first step for boundary loop detection, for the singular vertex v5, and 5 incident edges denoted as e0-e4 (counterclockwise) are incident to the vertex v5. Among the 5 incident edges, a first loop edge pair (e2, e3) and a second loop edge pair (e4, e0) are detected. For the first loop edge pair (e2, e3), the incident faces are (v4, v5, v10) and (v5, v6, v8). The vertex v5 in the two incident faces can be replaced by a new vertex v11 that is an alias vertex for the vertex v5. Thus, the 2 incident faces become (v4, v11, v10) and (v11, v6, v8).

Similarly, for the second loop edge pair (e4, e0), the incident faces are (v5, v6, v8) and (v5, v9, v10). The vertex v5 in the two incident faces can be replaced by a new vertex v12 that is an alias vertex for the vertex v5. Thus, the two incident faces become (v12, v6, v8) and (v12, v9, v10).

According to an aspect of the disclosure, the vertex 5 is split into the new vertex v11 and the new vertex v12. In an example, the new vertex v11 and the new vertex v12 can be assumed to be connected by a new edge (zero length). Each of the new vertices has two incident boundary edges and thus the new vertices v11 and v12 are regular vertices. Thus, the mesh (1100) is converted to a manifold mesh with the new vertices v11 and v12.

In the second step for boundary loop detection, a boundary loop detection algorithm for manifold meshes can be applied to the converted manifold mesh with the new vertices v11 and v12 and can detect a first boundary loop of (v0, v1, v2, v3, v4, v11, v6, v7) (exterior boundary loop) and a second boundary loop of (v8, v9, v12) (interior boundary loop).

Then, in the third step for boundary loop detection, the vertices v11 and v12 can be renamed back to v5 to determine the boundary loops for the mesh (1100). For example, the first boundary loop (v0, v1, v2, v3, v4, v11, v6, v7) of the converted manifold mesh becomes a first boundary loop (v0, v1, v2, v3, v4, v5, v6, v7) for the mesh (I 100), and the second boundary loop (v8, v9, v12) of the converted manifold mesh becomes a second boundary loop (v8, v9, v5) of the mesh (1100).

In some examples, the boundary loop detection results can be verified according to the Euler characteristic and Betti numbers. In the FIG. 11 example, the Euler characteristic $\chi = 11 - 22 + 11 = 0$, and the Betti numbers $b_0 = 1$, $b_2 = 0$, genus g=0, so the expected number of holes is $h = b_1 - 2g = b_0 + b_2 - \chi - 2g = 1$. Thus, according to the Euler characteristic and Betti numbers, there is one hole (interior boundary loop) in the mesh (1100) which matches the result from the boundary loop detection procedure for non manifold meshes.

According to an aspect of the disclosure, the boundary loop detection procedure for non manifold meshes can be generalized to handle higher dimensional simplicial complex meshes. For example, for simplicial 3-complexes, the topological surgery in the first step can be similarly performed to split singular vertices/edges in 3D, such as the vertices/edges touched by 2 or more tetrahedrons, to convert a non manifold mesh to a 3D manifold mesh. Then, the "boundary surface" can be determined in the 3D manifold mesh.

It is also noted that the boundary loop detection procedure can be applied for meshes that are not made of simplexes. In some examples, the meshes that are not made of simplexes can be remeshed to meshed with simplicial complexes. For example, quadrilateral meshes can be divided into triangular meshes. Then, the boundary loop detection procedure can be applied to the meshes with simplicial complexes.

Figure 12:
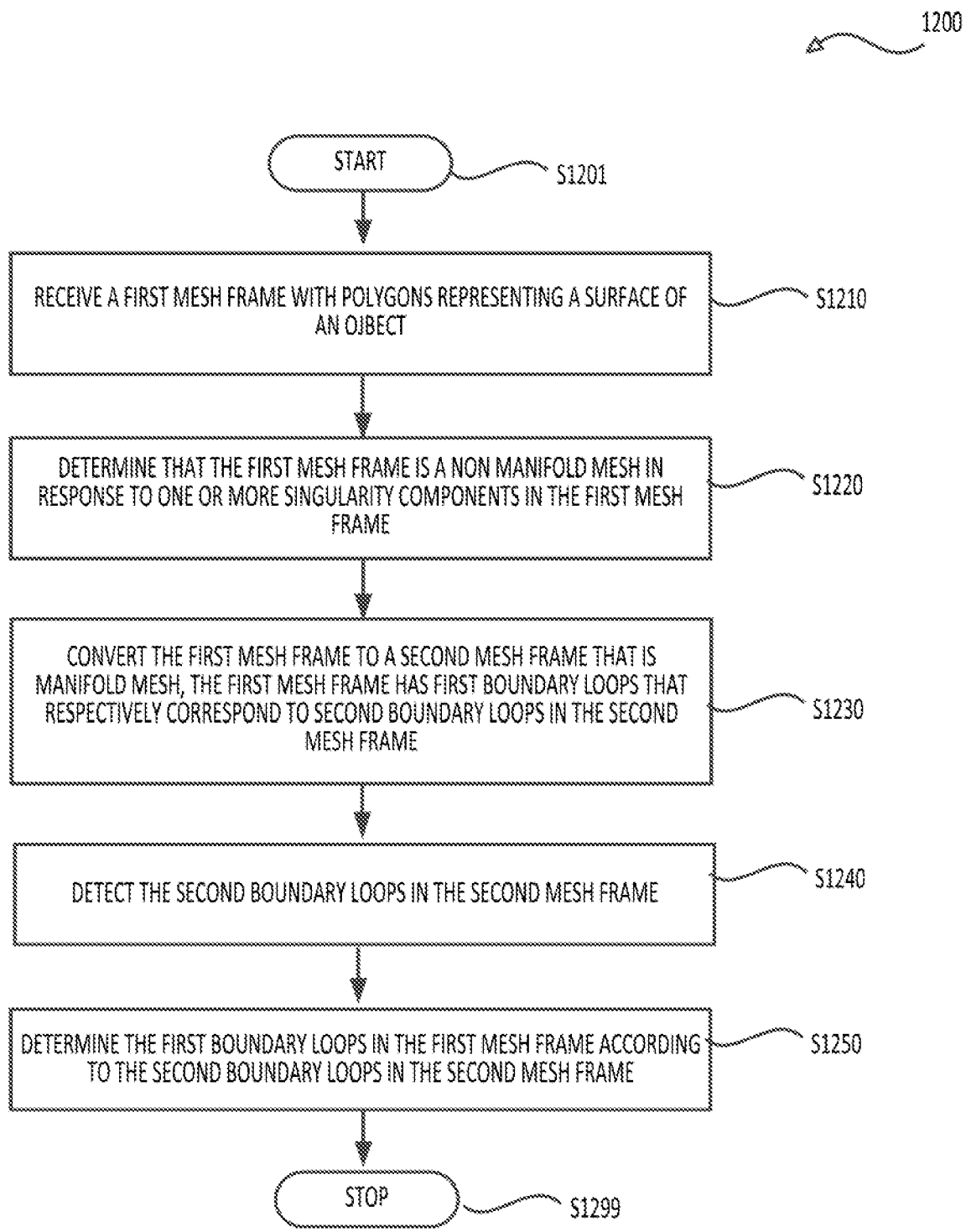
FIG. 12 shows a flow chart outlining a process example in some examples.

FIG. 12 shows a flow chart outlining a process (1200) according to an embodiment of the disclosure. The process (1200) can be used during an encoding process for a mesh. In various embodiments, the process (1200) is executed by processing circuitry. In some embodiments, the process (1200) is implemented in software instructions, thus when the processing circuitry executes the software instructions, the processing circuitry performs the process (1200). The process starts at (S1201) and proceeds to (S1210).

At (S1210), a first mesh frame is received. The first mesh frame represents a surface of an object with polygons. In some examples, the polygons are triangles. In some examples, the polygons can be divided into triangles.

At (S1220), one or more singularity components is detected in the first mesh frame, and the first mesh frame is determined to be a non manifold mesh in response to the one or more singularity components.

At (S1230), the first mesh frame is converted to a second mesh frame that is a manifold mesh, the first mesh frame has first boundary loops that respectively correspond to second boundary loops in the second mesh frame. The conversion of the first mesh frame to the second mesh frame does not affect the boundary loops. It is noted that any suitable operations can be applied to convert the first mesh frame to the second mesh frame as long as the operations do not affect the boundary loops.

At (S1240), the second boundary loops in the second mesh frame are detected by suitable detection algorithm for manifold meshes.

At (S1250), the first boundary loops in the first mesh frame are determined according to the second boundary loops in the second mesh frame.

To determine that the first mesh frame is the non manifold mesh, in some examples, at least a first vertex in the first mesh frame is detected to be a singular vertex. In an example, the first mesh frame is a simplicial 2 complex mesh, the first vertex is a boundary vertex, and a first number of incident faces and a second number of incident edges of the first vertex fails to satisfy a regular vertex requirement. In another example, a number of incident boundary edges to the first vertex is greater than 2.

In some examples, to determine that the first mesh frame is the non manifold mesh, at least a first edge in the first mesh frame is determined to be a singular edge. In an example, the first mesh frame is a simplicial 2 complex, and the first edge has no incident face or has more than 2 incident faces.

In some embodiments, the first mesh frame is a simplicial 2 complex mesh, a singular vertex of the first mesh frame is converted into one or more alias vertices in the second mesh frame, the one or more alias vertices are regular vertices. In some examples, a first singular vertex and a second singular vertex of a singular edge of the first mesh frame are converted into respective alias vertices in the second mesh frame, the respective alias vertices are regular vertices.

To convert the singular vertex of the first mesh frame into the one or more alias vertices in the second mesh frame, in some examples, a first incident face and a second incident face that are incident to the singular vertex are identified, the first incident face includes a first incident edge to the singular vertex, the second incident face includes a second incident edge to the singular vertex, the first incident edge and the second incident edge are adjacent incident edges from different incident faces. Then, an alias vertex is generated with the first incident face and the second incident face being incident to the alias vertex instead of the singular vertex. Thus, the alias vertex is a regular vertex with two incident boundary edges.

To determine the first boundary loops in the first mesh frame according to the second boundary loops in the second mesh frame, in some examples, in response to the alias vertex in the second boundary loops, the alias vertex in the second boundary loops is replaced by the singular vertex.

In some examples, an existence of one or more interior holes (also referred to as interior boundary loops) can be determined or verified based on a relationship between a Euler characteristic and Betti numbers in the first mesh frame.

In some examples, the first mesh frame and the second mesh frame are 2D mesh frames, and in some other examples, the first mesh frame and the second mesh frame are 3D mesh frames.

Then, the process proceeds to (S1299) and terminates.

The process (1200) can be suitably adapted. Step(s) in the process (1200) can be modified and/or omitted. Additional step(s) can be added. Any suitable order of implementation can be used.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits). In some examples, the one or more processors execute a program that is stored in a non-transitory computer-readable medium.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
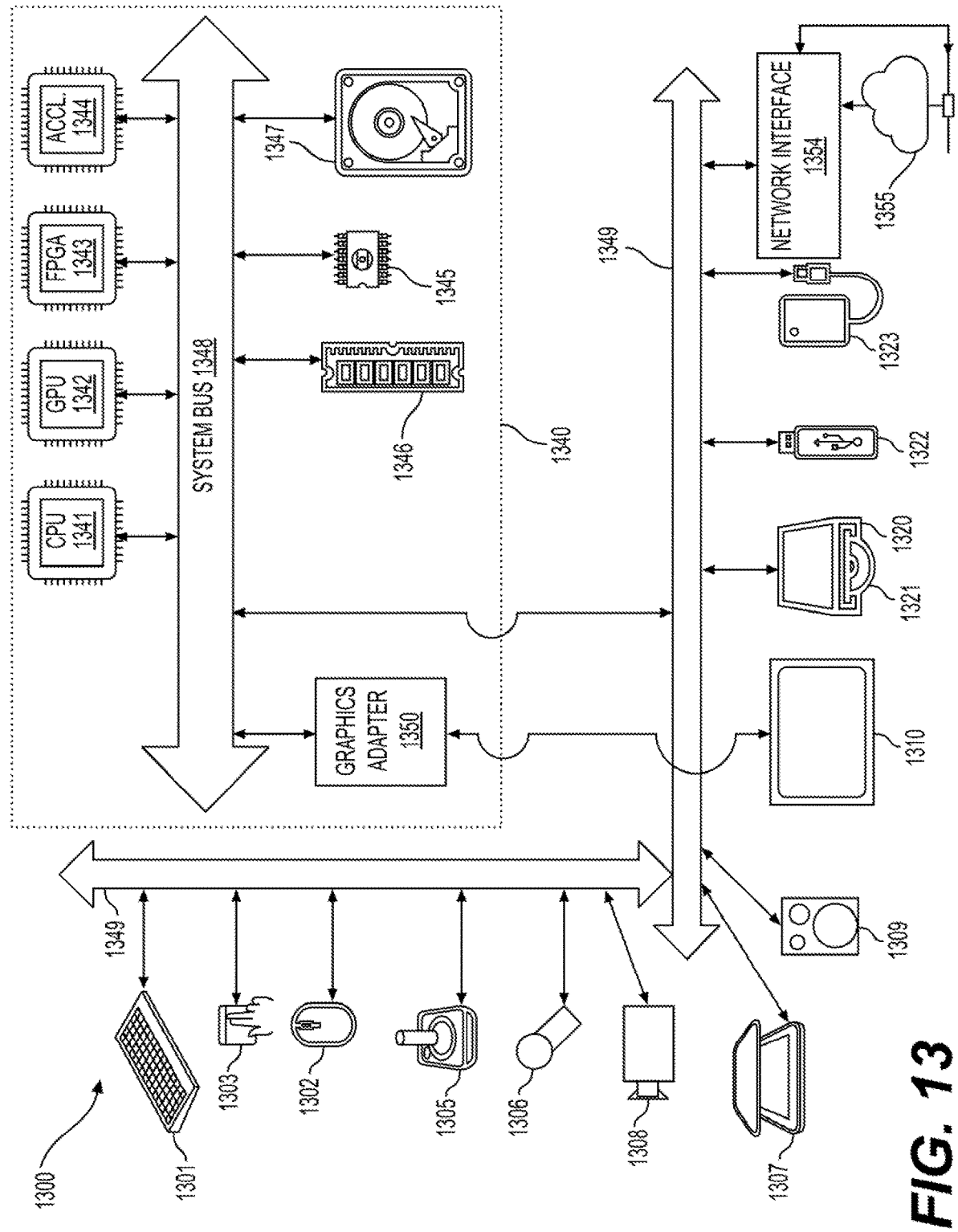
FIG. 13 is a schematic illustration of a computer system in some examples.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh processing, comprising:
   receiving a first mesh frame with polygons representing a surface of an object;
   determining that the first mesh frame is a non manifold type mesh in response to one or more singularity components in the first mesh frame;
   converting the first mesh frame to a second mesh frame that is a manifold type mesh, the first mesh frame having first boundary loops that respectively correspond to second boundary loops in the second mesh frame;
   detecting the second boundary loops in the second mesh frame; and
   determining the first boundary loops in the first mesh frame according to the second boundary loops in the second mesh frame.

2. The method of claim 1, wherein at least one vertex in the first mesh frame is duplicated in the second mesh frame.

3. The method of claim 1, wherein the determining that the first mesh frame is the non manifold type mesh further comprises:
   detecting at least one of a singular vertex and/or a singular edge in the first mesh frame.

4. The method of claim 1, wherein the first mesh frame is a simplicial 2 complex mesh, and the determining that the first mesh frame is the non manifold type mesh further comprises:
   determining that a first vertex is a boundary vertex;
   determining that a first number of incident faces and a second number of incident edges of the first vertex fails to satisfy a regular vertex requirement; and
   determining that the first vertex is a singular vertex.

5. The method of claim 1, wherein the first mesh frame is a simplicial 2 complex mesh, and the determining that the first mesh frame is the non manifold type mesh further comprises:
   determining that a number of incident boundary edges to a first vertex is greater than 2; and
   determining that the first vertex is a singular vertex.

6. The method of claim 1, wherein the first mesh frame is a simplicial 2 complex, and the determining that the first mesh frame is the non manifold type mesh further comprises:
   detecting that a first edge has no incident face or has more than 2 incident faces; and
   determining that the first edge is a singular edge.

7. The method of claim 1, wherein the first mesh frame is a simplicial 2 complex mesh, and the converting the first mesh frame to the second mesh frame further comprises:
   converting a singular vertex of the first mesh frame into one or more alias vertices in the second mesh frame, the one or more alias vertices being regular vertices.

8. The method of claim 7, further comprising:
   converting a first singular vertex and a second singular vertex of a singular edge of the first mesh frame into respective alias vertices in the second mesh frame, the respective alias vertices being regular vertices.

9. The method of claim 7, wherein the converting the singular vertex of the first mesh frame into the one or more alias vertices in the second mesh frame further comprises:
   identifying a first incident face and a second incident face that are incident to the singular vertex, the first incident face including a first incident edge to the singular vertex, the second incident face including a second incident edge to the singular vertex, the first incident edge and the second incident edge being adjacent incident edges from different incident faces; and
   generating an alias vertex with the first incident face and the second incident face being incident to the alias vertex in the second mesh frame instead of the singular vertex.

10. The method of claim 9, wherein the determining the first boundary loops in the first mesh frame according to the second boundary loops in the second mesh frame further comprises:
    in response to the alias vertex in the second boundary loops, replacing the alias vertex in the second boundary loops with the singular vertex.

11. The method of claim 1, further comprising:
    detecting an existence of one or more interior boundary loops based on a relationship between a Euler characteristic and Betti numbers in the first mesh frame.

12. An apparatus for mesh processing, comprising processing circuitry configured to:
    receive a first mesh frame with polygons representing a surface of an object;
    determine that the first mesh frame is a non manifold type mesh in response to one or more singularity components in the first mesh frame;
    convert the first mesh frame to a second mesh frame that is a manifold type mesh, the first mesh frame having first boundary loops that respectively correspond to second boundary loops in the second mesh frame;
    detect the second boundary loops in the second mesh frame; and
    determine the first boundary loops in the first mesh frame according to the second boundary loops in the second mesh frame.

13. The apparatus of claim 12, wherein at least one vertex in the first mesh frame is duplicated in the second mesh frame.

14. The apparatus of claim 12, wherein the processing circuitry is configured to:
    detect at least one of a singular vertex and/or a singular edge in the first mesh frame.

15. The apparatus of claim 12, wherein the first mesh frame is a simplicial 2 complex mesh, and the processing circuitry is configured to:
    determine that a first vertex is a boundary vertex;
    determine that a first number of incident faces and a second number of incident edges of the first vertex fails to satisfy a regular vertex requirement; and
    determine that the first vertex is a singular vertex.

16. The apparatus of claim 14, wherein the first mesh frame is a simplicial 2 complex mesh, and the processing circuitry is configured to:
    determine that a number of incident boundary edges to a first vertex is greater than 2; and
    determine that the first vertex is a singular vertex.

17. The apparatus of claim 12, wherein the first mesh frame is a simplicial 2 complex, and the processing circuitry is configured to:

detect that a first edge has no incident face or has more than 2 incident faces; and determine that the first edge is a singular edge.

18. The apparatus of claim 12, wherein the first mesh frame is a simplicial 2 complex mesh, and the processing circuitry is configured to:

convert a singular vertex of the first mesh frame into one or more alias vertices in the second mesh frame, the one or more alias vertices being regular vertices.

19. The apparatus of claim 18, wherein the processing circuitry is configured to:

convert a first singular vertex and a second singular vertex of a singular edge of the first mesh frame into respective alias vertices in the second mesh frame, the respective alias vertices being regular vertices.

20. The apparatus of claim 18, wherein the processing circuitry is configured to:

identify a first incident face and a second incident face that are incident to the singular vertex, the first incident face including a first incident edge to the singular vertex, the second incident face including a second incident edge to the singular vertex, the first incident edge and the second incident edge being adjacent incident edges from different incident faces; and generate an alias vertex with the first incident face and the second incident face being incident to the alias vertex in the second mesh frame instead of the singular vertex.

* * * * *